(12) United States Patent
Kuo

(10) Patent No.: US 6,241,919 B1
(45) Date of Patent: Jun. 5, 2001

(54) CASTING POLYMERIZATION FOR PRODUCING LIGHT GUIDE OF LCD

(76) Inventor: Chin-Piao Kuo, 7F, No. 38, Lane 147, Pao Hsin Rd., Pao Shan Hsiang, Hsinchu Hsien (TW)

( * ) Notice: Subject to any disclaimer, the term of this patent is extended or adjusted under 35 U.S.C. 154(b) by 0 days.

(21) Appl. No.: 09/130,229

(22) Filed: Aug. 7, 1998

(51) Int. Cl.$^7$ ..................................................... B29D 11/00
(52) U.S. Cl. ........................................... 264/1.24; 264/1.1
(58) Field of Search ................................... 264/1.1, 1.24, 264/1.36, 1.38

(56) References Cited

U.S. PATENT DOCUMENTS

| | | |
|---|---|---|
| 4,931,521 * | 6/1990 | Matsuda et al. . |
| 5,101,325 * | 3/1992 | Davenport et al. . |
| 5,283,563 * | 2/1994 | Allen et al. . |
| 5,449,703 * | 9/1995 | Mitra et al. ............................. 264/16 |
| 5,866,047 * | 2/1999 | Nagino et al. ....................... 264/1.38 |
| 5,883,684 * | 3/1999 | Millikan et al. . |

* cited by examiner

Primary Examiner—Mathieu D. Vargot
(74) Attorney, Agent, or Firm—Rosenberg, Klein & Lee

(57) ABSTRACT

The present invention relates to a technology for producing, based on a casting polymerization process, light guides for LCDs. The casting polymerization process includes the steps of: preparing a casting mold in the shape of double wedge for the casting polymerization process; mixing methyl methacrylate (MMA) with polymerization initiator to form a mix; prepolymerizing the mix to form a prepolymerized mix; processing the prepolymerized mix to form a slurry mix; casting the slurry mix into the casting mold; enabling polymerization of the slurry mix in the casting mold by heat treatment; and stripping the casting mold to obtain a light guide for a LCD.

4 Claims, 11 Drawing Sheets

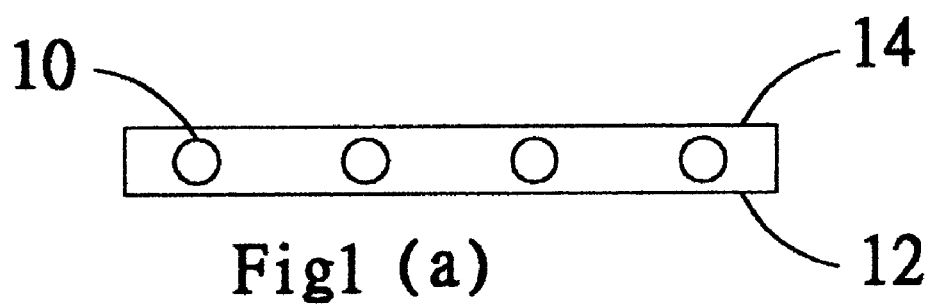
Fig1 (a)
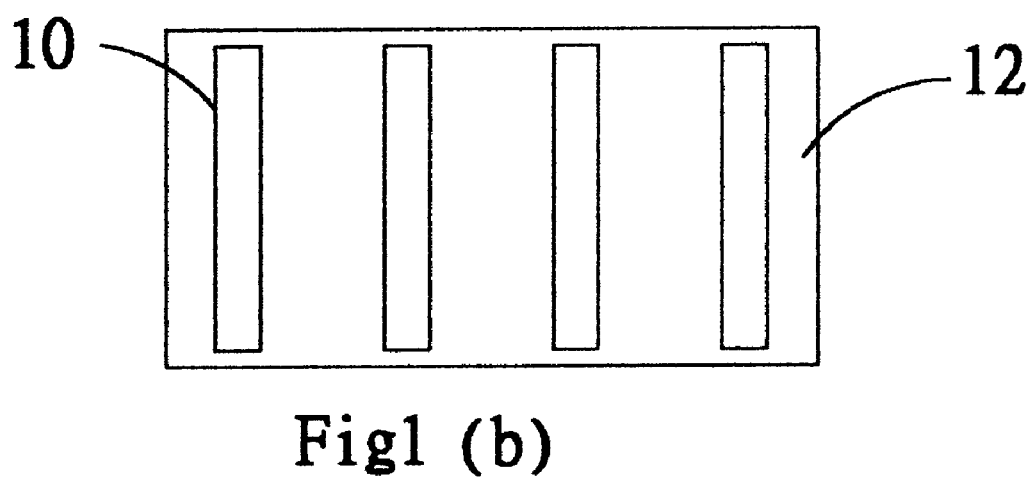
Fig1 (b)
Fig1

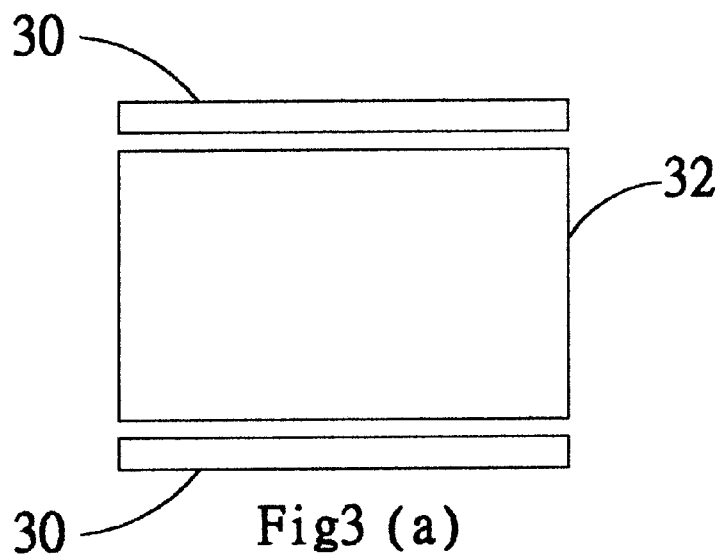
Fig3 (a)
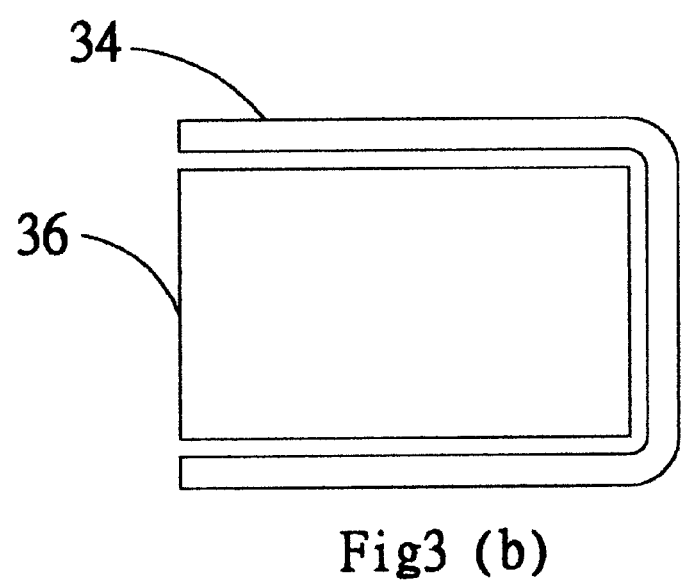
Fig3 (b)
Fig3

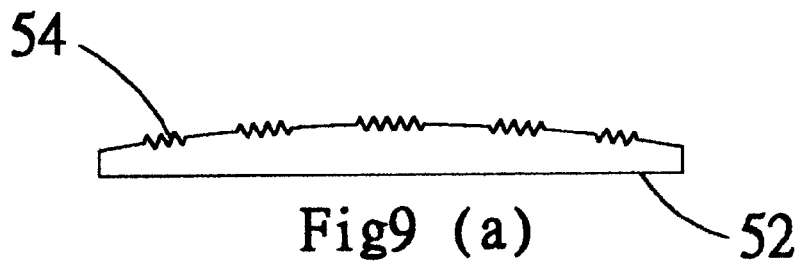
Fig9 (a)
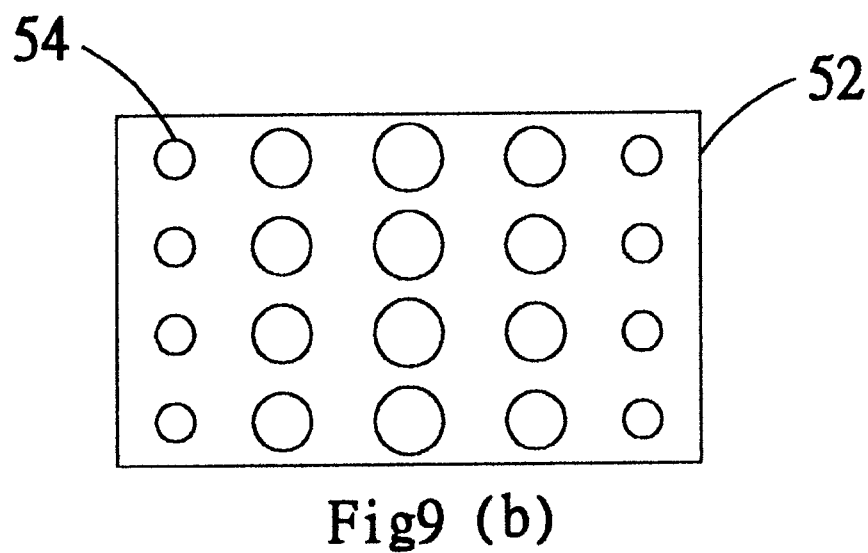
Fig9 (b)
Fig9

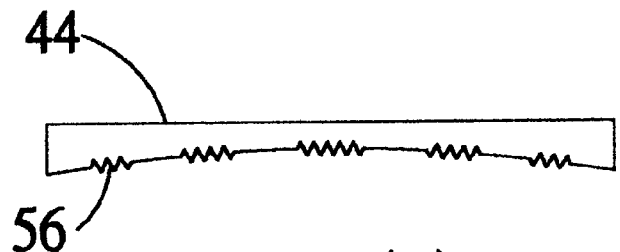
Fig10 (a)
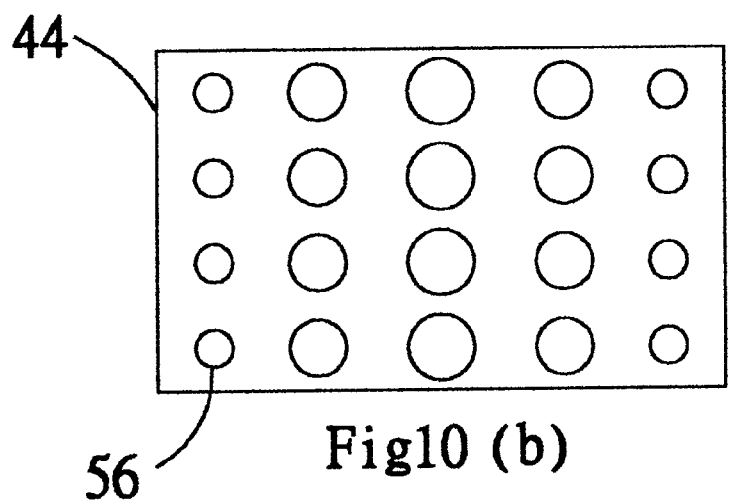
Fig10 (b)
Fig10

US 6,241,919 B1

CASTING POLYMERIZATION FOR PRODUCING LIGHT GUIDE OF LCD

FIELD OF THE INVENTION

The present invention relates to light guides (photo conductive plates) of a liquid crystal display (LCD), and particularly to the method of manufacturing light guides of relatively big size for LCDs.

BACKGROUND OF THE INVENTION

The backlight device of a LCD is classified into two types: direct light and edge light (side light) as respectively shown in FIG. 1 and FIG. 2. In FIG. 1 where FIG. 1(a) is the cross sectional view of Fig. 1(b), a backlight device of direct light type comprises an array of light source 10, a reflective plate 12 and a dispersion plate 14 respectively installed in the front and back sides of light source 10. The backlight device of edge light type shown in FIG. 2 comprises a light source 20 seated beside light guide 22 and surrounded by a light reflector 24, a dispersion plate 26 and a reflective plate 28 respectively seated in the front and back sides of light guide 22. FIG. 2(a) is the cross sectional view of FIG. 2(b). In terms of brightness, weight, and power consumption, the backlight device of edge light type is classified into three types: single edge, double edge, and tri-edge. Shown in FIG. 2 is the single edge type, while FIGS. 3(a) and 3(b) where light guides 32 and 36 are respectively accompanied by double edge light source 30 and tri-edge light source 34, are respectively the double edge and tri-edge types.

For a backlight device of edge light type, the light guide is a plate made of Acrylic material (PMMA), to guide light from edge, so that the light is dispersed to form an even surface light source. The light guide is usually made of Acrylic particles processed by injection molding, or is an Acrylic plate.

To achieve an even brightness for light guide, material with refractive index different from that of light guide (acrylic plate in the example) is usually printed on the surface of the light guide, or refractive faces of different angles are usually directly formed on the surface of the light guide. FIGS. 4–6 show three popular types of embodiments wherein FIGS. 4(a), 5(a), and 6(a) are respectively the cross sectional views of FIGS. 4(b), 5(b), and 6(b). Shown in FIG. 4 is a light guide 22 with printed organic layer 38 comprising light dispersion particles (for dispersing light) formed on one surface thereof. Shown in FIG. 5 is a light guide 22 with coarse structure 40 made on one surface thereof to form a face comprising concavities and convexities. Shown in FIG. 6 is a light guide 22 with concavities dug on one surface thereon to form a face in the shape of sawteeth.

For a LCD of relatively large size such as those bigger than 12 inches in diagonal, an Acrylic plate is too heavy to be used as a light guide. Although the problem may be solved by changing the shape of the light guide, it is hardly achievable by injection molding to manufacture the light guide because of the limitation on the size and the thickness difference control in injection molding, thereby acrylic plate is currently still used as the light guide for mass production of LCD of bigger size.

SUMMARY OF THE INVENTION

The primary object of the present invention is to provide a new manufacturing process for manufacturing light guides of LCDs.

Another objects of the present invention are:

Based on casting polymerization, the method according to the present invention for manufacturing the light guide of an LCD comprises the steps of:

preparing a casting mold in the shape of double wedge for processing casting polymerization;

mixing up methyl methacrylicate (MMA) with polymerization initiator to form a mix;

proceeding prepolymerization of the mix to form a prepolymerized mix;

processing the prepolymerized mix to form a slurry mix;

casting the slurry mix into the casting mold;

enabling polymerization of the slurry mix in the casting mold by heat treatment; and stripping the casting mold to obtain a light guide composed of transparent acrylic resin and in the shape of a double wedge.

One of the features of the present invention is that the bottom plate of the casting mold has surface which is not smooth, thereby a light guide with better light dispersion efficacy can be produced. The surface of the double wedge shaped light guide for different embodiments can be either a face with concavities and convexities or a face with sawteeth as long as the light guide can provide an even brightness throughout its surface.

Glass such as that produced by die-casting melted glass is preferred for manufacturing the casting mold.

With the casting polymerization method provided by the present invention for manufacturing light guides of LCDs, a light guide with thickness varying in a relatively large range from one part thereof to another part thereof can be realized, and the weight of a light guide can be significantly reduced, thereby the mass production of light guides of LCDs of relatively large size can be achieved.

The present invention may best be understood through the following description with reference to the accompanying drawings, in which:

BRIEF DESCRIPTION OF THE DRAWINGS

FIGS. 1(a)–1(b) and FIGS. 2(a)–2(b) respectively show a backlight device of direct light type and edge light type for LCDs.

FIGS. 3(a)–3(b) show conventional backlight devices of double edge type and tri-edge type for LCDs.

FIGS. 4(a) through 6(b) show three types of light guides with better light dispersion efficacy.

FIGS. 9(a) and 9(b) show another mold plate for manufacturing a light guide in the shape of double wedge to provide light dispersion efficacy.

FIGS. 10(a) and 10(b) show a light guide made by using the mold plate shown in FIG. 9.

DETAILED DESCRIPTION OF THE PREFERRED EMBODIMENTS

The method suggested by the present invention for manufacturing a light guide is based on a casting polymerization process comprising the steps of: preparing a casting mold in the shape of double wedge for processing the casting polymerization; mixing methyl methacrylate (MMA) with polymerization initiator to form a mix; prepolymerizing the mix to form a prepolymerized mix; processing the prepolymerized mix to form a slurry; casting the slurry mix into the casting mold; polymerizing the slurry mix in the casting mold by heat treatment; and stripping the casting mold to obtain a light guide composed of transparent acrylic resin and in the shape of a double wedge.

Figure 2:
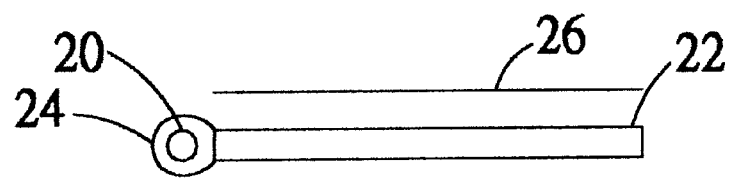
Figure 2:
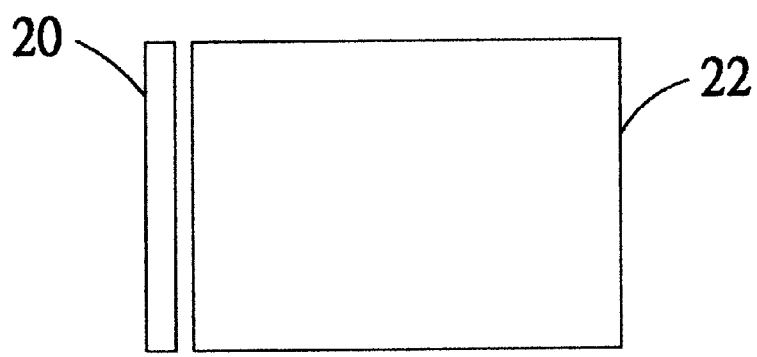
Figure 4:
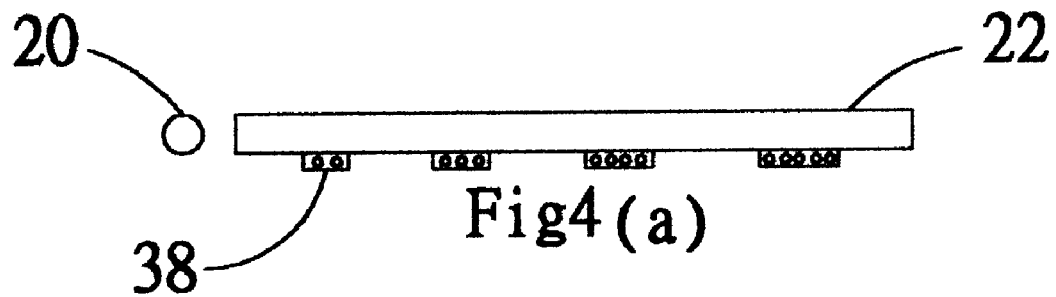
Figure 4:
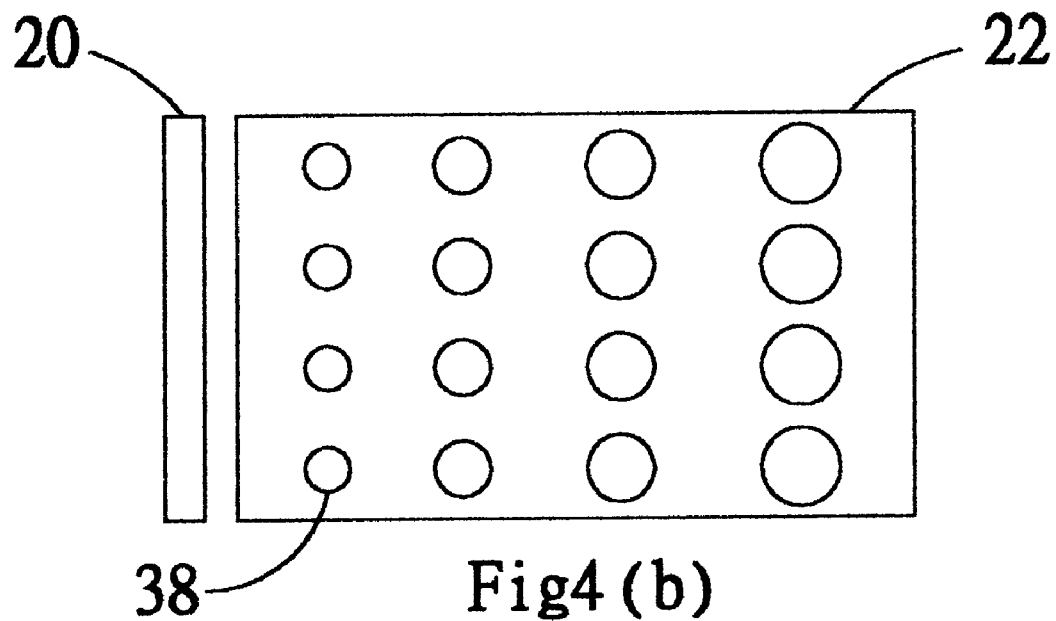
Figure 5:
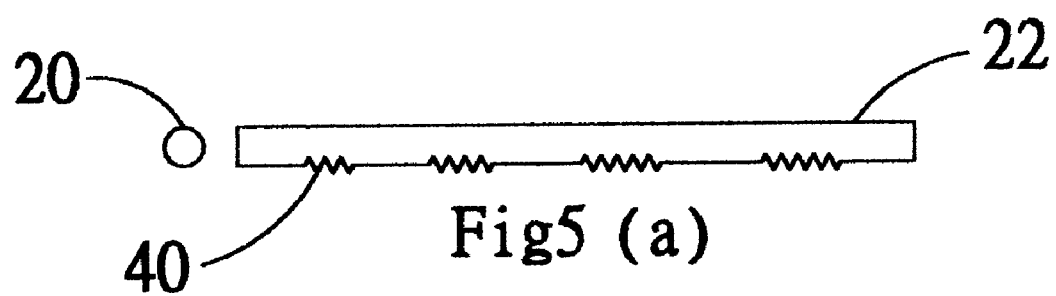
Figure 5:
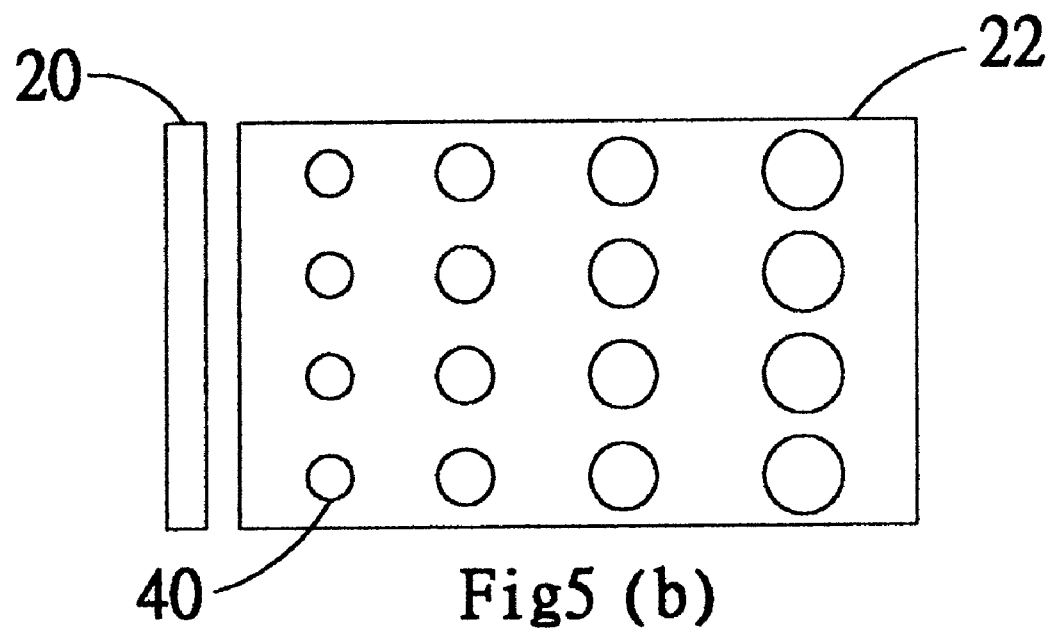
Figure 6:
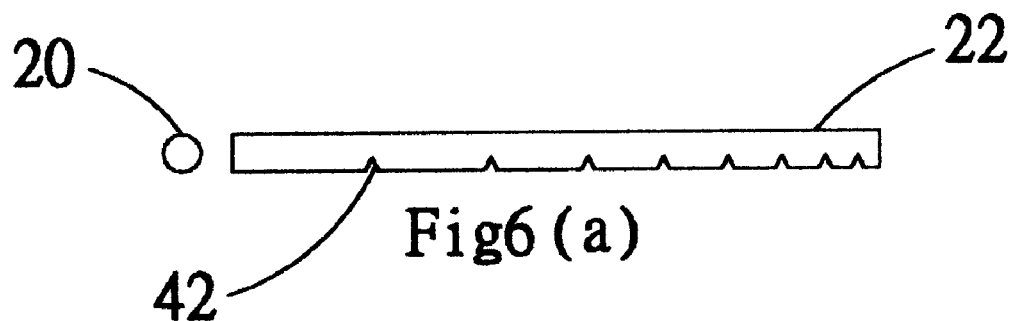
Figure 6:
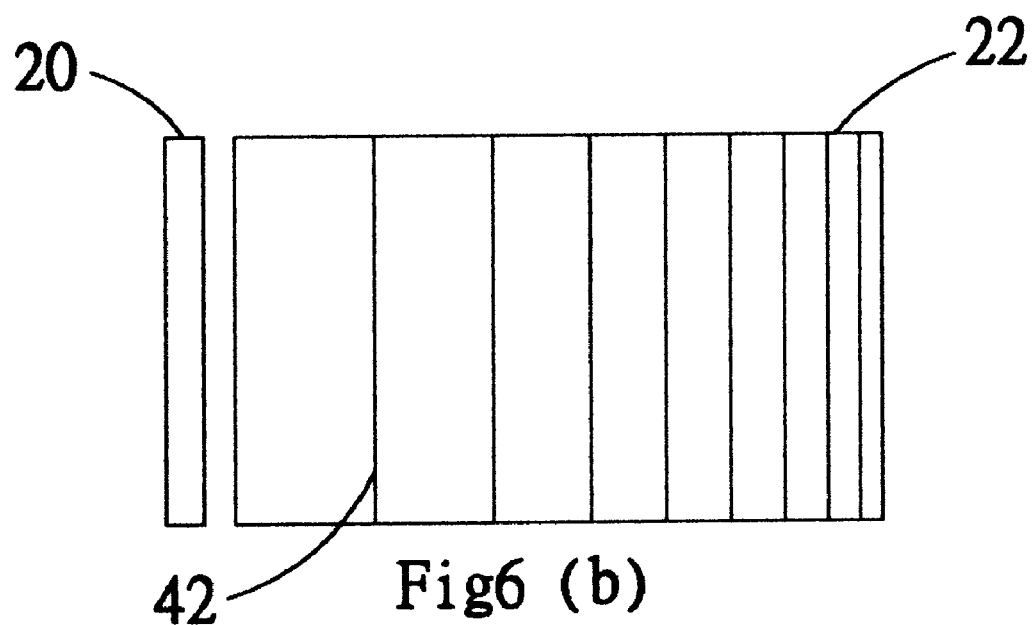
Figure 7:
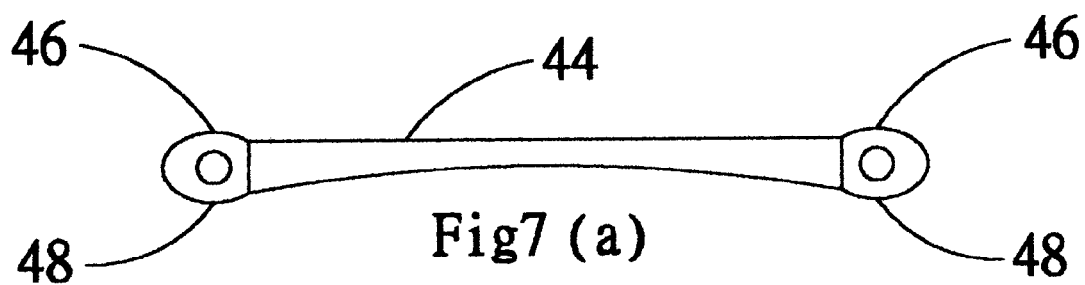
FIGS. 7(a) and 7(b) show a light guide provided by the present invention and in the shape of double wedge.
Figure 7:
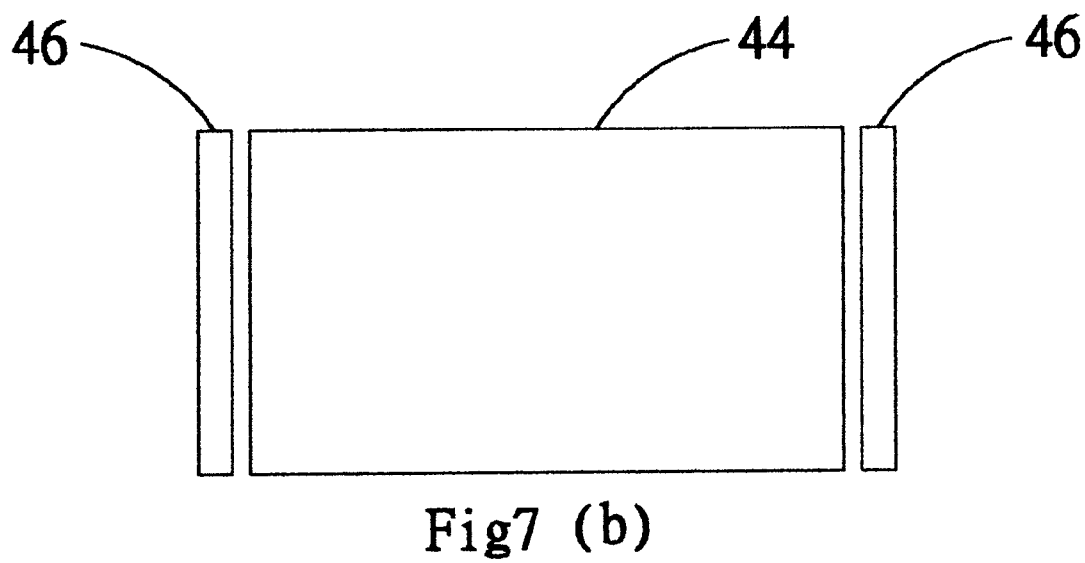

A preferred embodiment for a light guide is shown in FIG. 7 where FIG. 7(a) is the cross sectional view of FIG. 7(b), light guide 44 is in the shape of double wedge, with one surface flat and another surface concave, light source 46 are seated on both sides of light guide 44 and are surrounded by light reflector 48. The light guide made in such a way to be in the shape of double wedge can afford to have relatively less weight. Take an acrylic light guide of 14 inches in diagonal for example, the thickness difference between its center and edge can be more than 3 mm, resulting in more than 20% of weight reduction.

Figure 8:
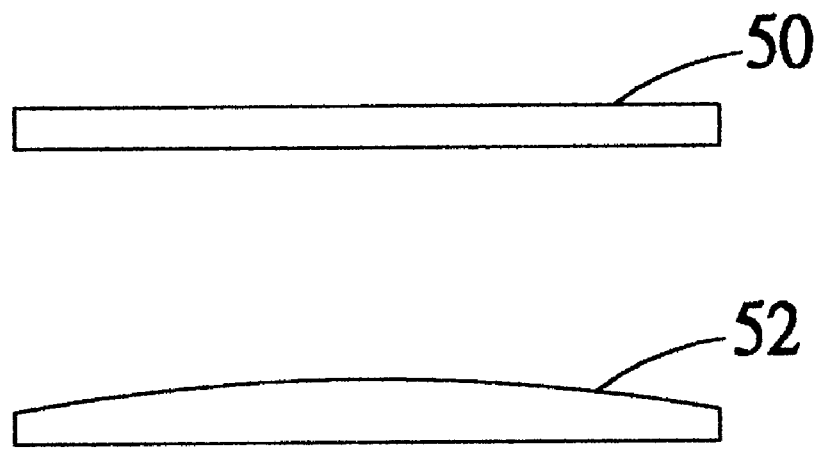
FIG. 8 shows a two part mold plate for manufacturing the light guide shown in FIG. 7.

A mold for manufacturing the light guide shown in FIG. 7 is shown in FIG. 8, where upper mold 50 which is a flat glass and bottom mold 52 which is a glass in the shape of double wedge are the main parts of the mold. The mold of this type can be made by die-casting melted glass.

To improve the brightness uniformity on the surface of a light guide, the surface of such a light guide in the shape of double wedge can be configured to be not smooth. Shown in FIG. 9 [here FIG. 9(a) is the cross sectional view of FIG. 9(b)] is a mold 52 with coarse structure 54, which can be used to manufacture a light guide 44 shown in FIG. 10 [here FIG. 10(a) is the cross sectional view of FIG. 10(b)] where light guide 44 comprises coarse structures 56 among which those in the center part have relatively large area size (compared with those around the edge). The further a coarse structure is from the center part of the light guide, the smaller area size it has. It should be obvious to those skilled in the art that there are various ways to form the surface of a light guide in a variety of shapes or structures for achieving a light guide with surface not smooth. For example, a surface with sawteeth structure, or a surface printed with material having refractive index different from that of the material constituting the surface (different from that of acrylic if the light guide is an acrylic plate).

Figure 11:
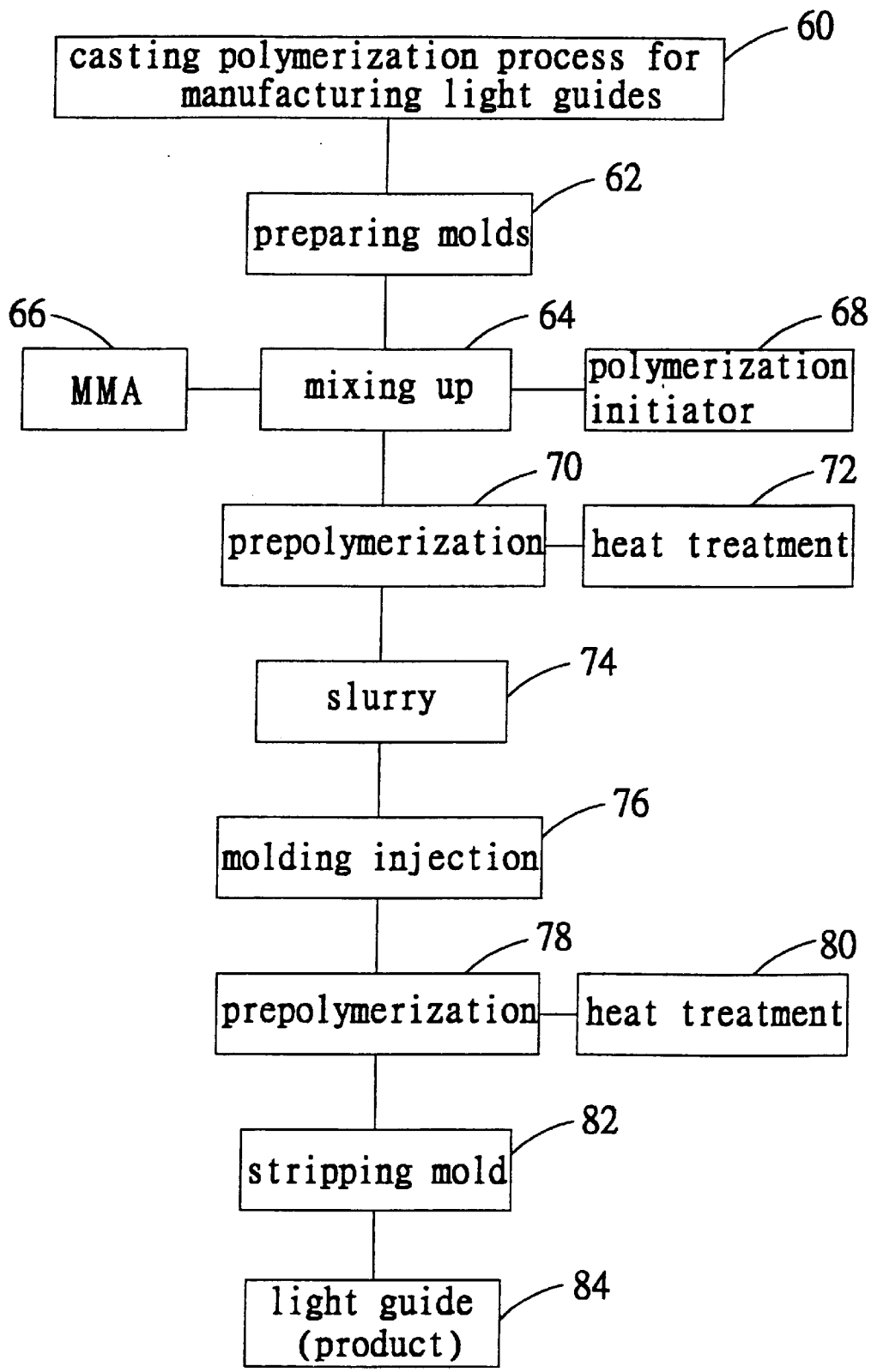
FIG. 11 shows a manufacturing process based on the present invention for manufacturing a light guide.

The process for manufacturing the light guide shown in FIG. 7 and FIG. 10 is shown in FIG. 11 where casting polymerization process 60 for manufacturing light guides comprises step 62: properly selecting a casting mold (such as one in the shape of double wedge, or those shown in FIG. 8 and FIG. 9); step 64: mixing polymerization material such as methyl methacrylate (MMA) 66 and polymerization initiator 68 to form a mix; step 70: prepolymerizing the mix by preliminary polymerizing monomer to form a prepolymerized mix (heat treatment may be applied to the step); step 74: processing the prepolymerized mix to form a slurry mixer; step 76: casting the slurry mix into the casting mold; step 78: enabling complete polymerization of the slurry mix in the casting mold by heat treatment 80 to raise polymerization speed and efficacy, methyl methacrylate (MMA) is thus completely polymerized; and step 82: stripping the casting mold to obtain a light guide 84 composed of transparent acrylic resin and in the shape of a double wedge.

Based on the casting polymerization process suggested by the present invention, even light guides of large size can be easily produced, and thickness difference between different parts of the same light guide can be big enough to significantly reduce the weight of the light guide, enabling the mass production of light guides more suitable for application, and contributing to product promotion in related industries.

While the invention has been described in terns of what are presently considered to be the most practical and preferred embodiments, it shall be understood that the invention is not limited to the disclosed embodiment. On the contrary, it is intended to cover various modifications and similar arrangements included within the spirit and scope of the following claims which are to be accorded with the broadest interpretation to encompass all modifications and similar structures based thereon.

What is claimed is:

1. A process for manufacturing a light guide for an LCD comprising the steps of:

preparing a casting mold in the shape of a double wedge for processing casting polymerization;

mixing methyl methacrylate (MMA) with a polymerization initiator to form a mix;

prepolymerizing said mix to form a prepolymerized mix;

processing said prepolymerized mix to form a slurry mix;

casting said slurry mix into said casting mold;

enabling polymerization of said slurry mix in said casting mold by heat treatment; and stripping said casting mold to obtain a light guide for an LCD.

2. The process according to claim 1 wherein said casting mold has a surface thereof different from smooth faces.

3. The process according to claim 2 wherein said casting mold has a surface thereof comprising a structure selected from among concavities and convexities.

4. The process according to claim 2 wherein said casting mold has a surface thereof in the shape of sawteeth.

* * * * *